United States Patent
Kori

(10) Patent No.: US 7,392,389 B2
(45) Date of Patent: Jun. 24, 2008

(54) ELECTRONIC TRANSMISSION DEVICE, AND SIGNAL TRANSMISSION METHOD

(75) Inventor: Teruhiko Kori, Kanagawa (JP)

(73) Assignee: Sony Corporation (JP)

( * ) Notice: Subject to any disclaimer, the term of this patent is extended or adjusted under 35 U.S.C. 154(b) by 563 days.

(21) Appl. No.: 10/044,422

(22) Filed: Jan. 11, 2002

(65) Prior Publication Data

US 2002/0095574 A1    Jul. 18, 2002

(30) Foreign Application Priority Data

Jan. 16, 2001    (JP)    ............................ P2001-008249

(51) Int. Cl.
*H04L 9/00*    (2006.01)

(52) U.S. Cl. ........................ 713/170; 380/228; 380/239

(58) Field of Classification Search ................. 713/170; 380/228, 239
See application file for complete search history.

(56) References Cited

U.S. PATENT DOCUMENTS

| | | | | |
|---|---|---|---|---|
| 4,454,544 A | * | 6/1984 | Abbott ........................ 380/225 |
| 4,558,176 A | * | 12/1985 | Arnold et al. ................ 713/190 |
| 4,819,069 A | * | 4/1989 | Tanaka ........................ 348/731 |
| 5,255,384 A | * | 10/1993 | Sachs et al. .................. 711/207 |
| 5,499,298 A | * | 3/1996 | Narasimhalu et al. ......... 705/54 |
| 5,504,816 A | * | 4/1996 | Hamilton et al. ............ 380/217 |
| 5,619,671 A | * | 4/1997 | Bryant et al. ................ 711/202 |
| 5,805,706 A | * | 9/1998 | Davis .......................... 713/153 |
| 5,886,732 A | * | 3/1999 | Humpleman ................. 725/49 |
| 5,920,592 A | * | 7/1999 | Tanaka et al. ................ 375/220 |
| 5,953,321 A | * | 9/1999 | Berrada et al. .............. 370/322 |
| 5,999,629 A | * | 12/1999 | Heer et al. .................... 705/51 |
| 6,018,581 A | * | 1/2000 | Shona et al. .................. 380/46 |
| 6,041,123 A | * | 3/2000 | Colvin, Sr. ................... 713/153 |
| 6,047,189 A | * | 4/2000 | Yun et al. ................. 455/452.2 |
| 6,061,451 A | * | 5/2000 | Muratani et al. ............ 380/201 |
| 6,069,647 A | * | 5/2000 | Sullivan et al. ................ 725/29 |
| 6,091,945 A | * | 7/2000 | Oka ............................ 455/411 |
| 6,128,605 A | * | 10/2000 | Saito et al. .................... 705/57 |
| 6,144,739 A | * | 11/2000 | Witt et al. ....................... 380/2 |
| 6,157,719 A | * | 12/2000 | Wasilewski et al. ......... 380/210 |
| 6,185,686 B1 | * | 2/2001 | Glover ........................ 713/190 |
| 6,188,397 B1 | * | 2/2001 | Humpleman ................. 725/80 |
| 6,211,919 B1 | * | 4/2001 | Zink et al. ................... 348/473 |
| 6,212,329 B1 | * | 4/2001 | Sugahara ...................... 386/94 |
| 6,229,895 B1 | * | 5/2001 | Son et al. .................... 380/200 |
| 6,236,727 B1 | * | 5/2001 | Ciacelli et al. .............. 380/212 |
| 6,243,530 B1 | * | 6/2001 | Kato ............................ 386/94 |
| 6,252,964 B1 | * | 6/2001 | Wasilewski et al. ......... 380/282 |
| 6,393,567 B1 | * | 5/2002 | Colnot ........................ 713/182 |

(Continued)

*Primary Examiner*—Nasser Moazzami
*Assistant Examiner*—David Garcia Cervetti
(74) *Attorney, Agent, or Firm*—Lerner, David, Littenberg, Krumholz & Mentlik, LLP

(57) ABSTRACT

An electronic signal transmission device comprises a first communication section to be connected to a first electronic device of a signal transmitting side; a second communication section to be connected to a second electronic device of a signal receiving side; an authentication section for executing an authentication process with the first electronic device and supplying key information for decryption; a decryption section for executing a decryption process of an encrypted signal supplied from the first electronic device based on the key information from the authentication process; and a supply section for directly supplying the encrypted signal from the first electronic device and the key information to the second communication section in order to avoid signal delay by the authentication.

7 Claims, 10 Drawing Sheets

U.S. PATENT DOCUMENTS

| | | | |
|---|---|---|---|
| 6,408,336 B1 * | 6/2002 | Schneider et al. | 709/229 |
| 6,415,031 B1 * | 7/2002 | Colligan et al. | 380/200 |
| 6,493,874 B2 * | 12/2002 | Humpleman | 725/78 |
| 6,510,519 B2 * | 1/2003 | Wasilewski et al. | 713/168 |
| 6,516,412 B2 * | 2/2003 | Wasilewski et al. | 713/168 |
| 6,516,467 B1 * | 2/2003 | Schindler et al. | 725/153 |
| 6,529,506 B1 * | 3/2003 | Yamamoto et al. | 370/389 |
| 6,587,873 B1 * | 7/2003 | Nobakht et al. | 709/219 |
| 6,668,324 B1 * | 12/2003 | Mangold et al. | 713/189 |
| 6,681,326 B2 * | 1/2004 | Son et al. | 713/150 |
| 6,721,437 B1 * | 4/2004 | Ezaki et al. | 382/100 |
| 6,735,311 B1 * | 5/2004 | Rump et al. | 380/231 |
| 6,741,991 B2 * | 5/2004 | Saito | 707/9 |
| 6,765,599 B2 * | 7/2004 | Nagai et al. | 345/520 |
| 6,789,197 B1 * | 9/2004 | Saito | 713/193 |
| 6,834,110 B1 * | 12/2004 | Marconcini et al. | 380/239 |
| 6,983,371 B1 * | 1/2006 | Hurtado et al. | 713/189 |
| 7,093,295 B1 * | 8/2006 | Saito | 726/26 |
| 7,130,426 B1 * | 10/2006 | Cha et al. | 380/201 |
| 7,203,314 B1 * | 4/2007 | Kahn et al. | 380/239 |
| 2001/0013022 A1 * | 8/2001 | Proidl | 705/52 |
| 2002/0013902 A1 * | 1/2002 | Youstra | 713/170 |
| 2003/0005284 A1 * | 1/2003 | Euchner | 713/152 |
| 2003/0190044 A1 * | 10/2003 | Higashi et al. | 380/201 |
| 2004/0032950 A1 * | 2/2004 | Graunke | 380/42 |
| 2005/0144478 A1 * | 6/2005 | Yamanaka et al. | 713/201 |
| 2005/0232414 A1 * | 10/2005 | Oofuji et al. | 380/28 |
| 2007/0118770 A1 * | 5/2007 | Kahn et al. | 713/193 |

* cited by examiner

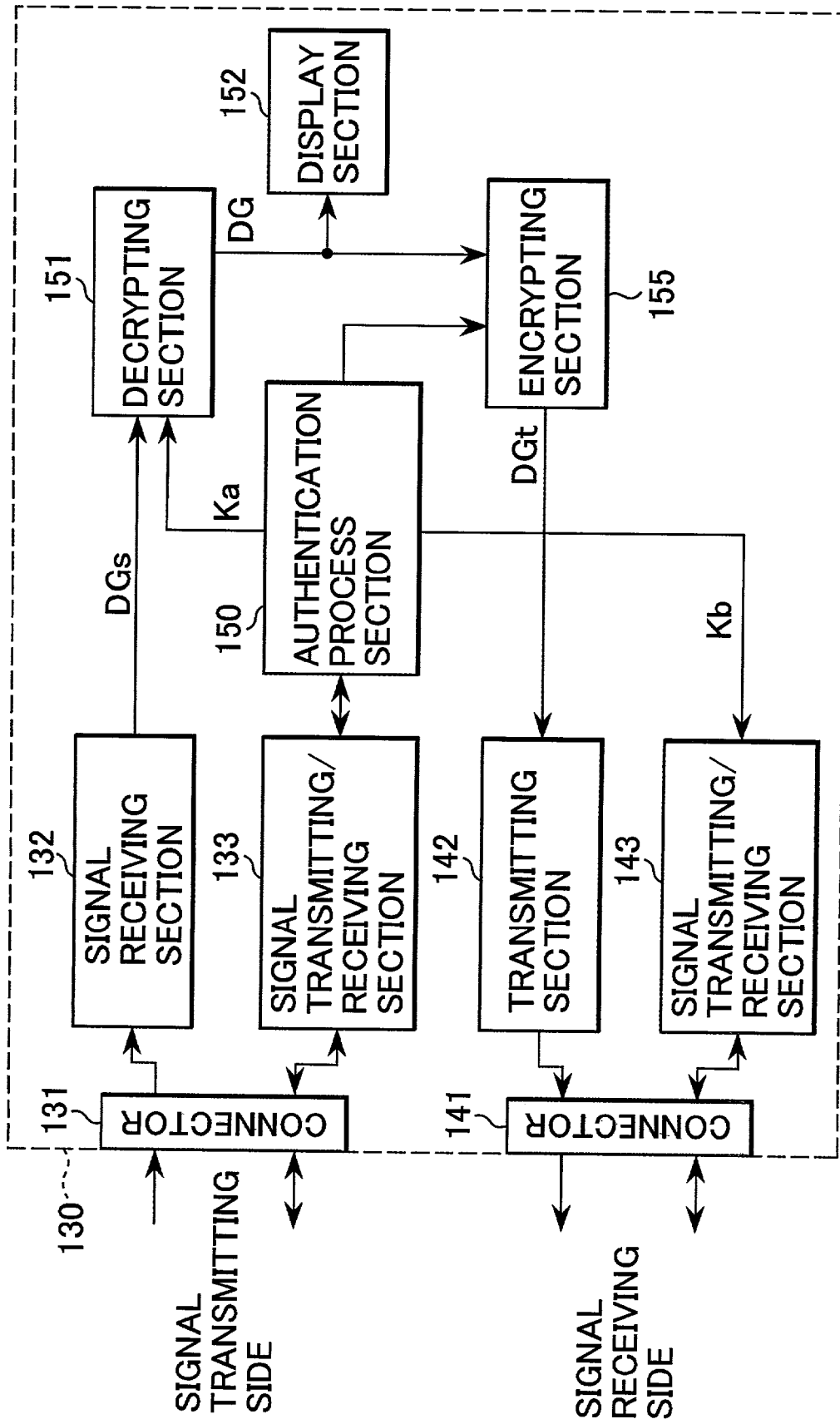

ELECTRONIC TRANSMISSION DEVICE, AND SIGNAL TRANSMISSION METHOD

CROSS REFERENCE TO RELATED APPLICATIONS

This application claims priority from Japanese Priority Documents No. 2001-008249, filed on Jan. 16, 2001 with the Japanese Patent Office, which document is hereby incorporated by reference.

BACKGROUND OF THE INVENTION

1. Field of the Invention

This invention related to an electronic transmission device and a signal transmission method using such electronic transmission device. More particularly, the present invention relates to an electronic transmission device that can avoid signal delay when connected in serial form to another electronic device even an authentication process is applied at each of the electronic transmission device.

2. Description of the Related Art

Conventionally in a computer apparatus or the like, a digital image signal is once converted into an analog image signal and then supplied to a display device by way of an analog transmission line. However, as a display device such as a LCD (Liquid Crystal Display) that is driven its display section by the digital signal is getting popular, a digital transmission method for driving the display device without converting the digital image signal into the analog image signal has become standard in order to avoid deterioration of image quality and reduction of cost.

FIG. 6 shows a construction chart of a digital connection, wherein two electronic devices such as a signal transmission device 100 and a signal reception device 130 are connected by way of a digital transmission line. Regarding the digital transmission line, the DVI (Digital Visual Interface) format is proposed by the DDWG (Digital Display Working Group), for example. In this DVI format, digitized three primary color image signals are serially transmitted color by color at base band transmission through the TMDS (Transition Minimized Differential Signals) high-speed transmission line developed by US Silicon Image Co. Further, a two-way transmission line such as the I²C (Inter Integrated Circuit) bus having a lower transmission speed than the TMDS high-speed transmission line (here-in after referred to as a high-speed serial bus) is provided, and this two-way transmission line (here-in after referred to as a two-way serial bus) is applied as a transmission line for the DDC (Display Data Channel) format in relating to the Plug & Play proposed by the VESA (Video Electronics Standards Association).

A transmission band for this high-speed serial bus of the DVI format can transmit image signal by using 3 channels (single-link) high-speed serial bus, as shown in FIG. 7, in a case when data amount of transmitting image signal is up to about 165 M-pixels/sec., namely an image display of SXGA (Super Extended Graphics Array) (1280 pixels×1024 pixels) size and a vertical frequency of 85 Hz with a GTF (General Timing Formula) blanking is executed or an image display of an UXGA (ultra Extended Graphics Array) (1600 pixels×1200 pixels) size and vertical. frequency of 60 Hz with a GTF blanking is executed. However, in a case when an image display of an UXGA (1600 pixels×1200 pixels) size and a vertical frequency of 75 Hz with a GTF blanking is executed, a 2-link high-speed serial bus is employed.

Contents data transmitted through such digital transmission line like the above-described can be easily and infinitely copied in a perfect form because of the digital signal transmission. This becomes a great merit for a user, but becomes serious problems for a provider who supplies copyrighted materials such as films with a legal protection. Because of this, it is proposed that in case of transmitting a digital signal of the contents data through the digital transmission line of the DVI format, an encryption for the copyright protection is executed and a decryption is made possible at a receiving side only if an authentication is properly conducted.

By the way, between two electronic device for legal protection, namely an authentication process is executed between a signal transmission device for outputting encrypted digital image signal of the contents and a signal reception device for receiving a signal from the signal transmission device as a pair, and if it is judged that an authorized device is connected, then key information f or decrypting the encrypted digital image signal of the contents data is supplied. In this case, image display operations by the plural signal reception device are executed in order to improve advertising effect, such plural signal reception devices are connected to multi-stage by a star connection as shown in FIG. 8. In this case, when the authentication is properly executed with the signal transmission device 100 and each of the signal reception devices 130, the key information is supplied to the signal reception device from the signal transmission device and it becomes possible to execute the image display by the signal reception device to which the key information is supplied.

If a relay function is added to the signal reception device, a plurality of signal reception devices 130 are connected to the signal transmission device 100 in a multistage daisy-chain connection as shown in FIG. 9.

FIG. 10 shows a conventional signal reception device to which a relay function is employed. A signal receiving section 132, and a signal transmitting/receiving section 133 is connected to a signal transmitting side through a two-way serial bus connected to the connector 131. Further a transmitting section 142 is also connected to the signal receiving side through the; high-speed serial bus connected to the conductor 141 and the signal transmitting/receiving section 143 is also connected to the signal receiving side through the two-way serial bus connected to the connector 141.

A decrypting section 151 is connected to the signal receiving section 132 and supplies an encrypted digital signal DGs transmitted from the signal transmitting side to a decrypting section 151. Further the signal transmitting/receiving section 133, 143 are connected to an authentication process section 150 and executes an authentication process together with the signal transmitting side and the signal receiving side by way of the two-way serial bus.

In case of transmitting the encrypted digital image signal of the contents data for a legal protection, the authentication process is executed between the authentication process section 150 of the signal reception device and the signal transmitting side, and when key information Ka is supplied from the signal transmitting side to the authentication process section 150 and when authenticated as a connection of an authorized device, the authentication process section 150 supplies the key information Ka to the decrypting section 151.

The decrypting section 151 executes the decryption of the encrypted digital signal DGs supplied from the signal receiving section 132 by applying the key information Ka supplied from the authentication process section 150. The decryption is executed at the decrypting section 151, and thus obtained three primary color digital image signals DG are supplied to a display section 152 and image display is executed at the display section 152. Further the three primary color digital image signals DG obtained at the decrypting section 151 are also supplied to an encryption section 155.

When the relay for the digital image signal of the contents data is executed, key information is supplied from the authentication process section 150 to the encryption section 155 and an encryption of the three primary color digital image signals DG is executed by applying the key information supplied from the authentication process section 150 in the encryption section 155. A digital signal DGt generated at the encryption section 155 is supplied to the transmitting section 142, and is then supplied to the signal receiving side from the transmitting section 142 through the high-speed serial bus and the connector 141.

Further, in the authentication process section 150, the authentication process is executed with the signal receiving side connected to the connector 141, and if the authentication process indicates that the device is the authorized one, key information Kb for decrypting the encrypted digital signal DGt is also supplied to the signal receiving side.

Thus the image display is done by decrypting the received digital image signal DGs and further thus obtained digital signal is supplied to another signal receiving side by re-encrypting the decrypted signal DG. In this case, when it is judged by the authentication process with the signal receiving side that the authorized device is connected, then the key information Kb for decrypting the supplied digital image signal is transmitted to the signal receiving side. Accordingly, when a plurality of devices is connected in daisy-chain connection, it is possible to attain the legal protection properly.

In this case, when a plurality of signal reception devices is connected to a single signal transmission device as shown in FIG. 8, due to limitation of size and design of the signal transmission device, the number of connectors to be provided on the signal transmission device has a limitation, and there is a case where desired numbers of signal reception devices cannot be connected.

The encrypted signal is executed the image display after decryption and thus decrypted signal is supplied to another signal reception device after re-encrypting the decrypted signal as shown in FIG. 10, then the decryption and encryption process are to be done at every time when the signal is relayed. Accordingly, the digital image signal of the contents data is delayed at every time when relayed through one signal reception device by the decryption and encryption process, so that if relatively large number of signal reception devices are connected in the daisy-chain connection, the time delay is accumulated at the last connected signal reception device. In this case, the time difference of the displayed image between the display image by the signal reception device of the signal transmission device side and the display image by the signal reception device connected at the end of the daisy-chain connection become relatively large and thereby, the simultaneity of the image display cannot be maintained.

SUMMARY OF THE INVENTION

According to the present invention, a signal transmission method capable of transmitting encrypted signal to a plurality of devices with a minimized delay and further an electronic transmission device therefore are presented.

An electronic transmission device of this invention comprises: a first and second communication means connected to a signal transmission line for connecting a pair of first and second electronic devices for communication; a authentication process means for executing an authentication process with the first electronic device of a signal transmitting side through at least the first communication means; a decryption means for decrypting the encrypted signal; and a process means for processing the signal obtained by decryption at the decryption means. The authentication process means supplies key information for decrypting the encrypted signal supplied from the first electronic device to the decryption means based on the result of the authentication process and the first communication means supplies the encrypted signal from the first electronic device connected by way of the signal transmission line to the decryption means and the second communication means, and thereby the second communication means is enabled to execute the transmission of the encrypted signal and the key information, and to execute the authentication process of the second electronic device to the second electronic device of the signal receiving side.

Further in the signal transmission method, the authentication process is executed with the first electronic device of the signal receiving side connected through the signal transmission line for connecting the electronic devices, and according to, the result of the authentication process, the decryption process is executed for the encrypted signal supplied from the first electronic device by using key information supplied from the first electronic device and thereby the signal processing is executed with thus obtained signal. The authentication process or the relay of the authentication process for the second electronic transmission device connected through the signal transmission line is executed and the transmission of the encrypted signal supplied from the first electronic device and the key information for decrypting the encrypted signal based on a result of the authentication process are executed to the second electronic device.

In accordance with the present invention, the authentication process for the electronic device of the signal transmitting side, the signal transmission device, for example, connected through the signal transmission line is executed and if it is judged that the authorized device is connected as a result of the authentication process, them key information is supplied from the signal transmission device. Then the encrypted signal supplied from the signal transmission device is decrypted with this key information and an image display operation or the like of the signal receiving side, namely the signal reception device connected through the signal transmission line, for example. The authentication process or the relay of the authentication process of this signal reception device with the signal transmission device, and if it is judged that the authorized device is connected, then the key information for decrypting the encrypted signal is supplied to the signal reception device.

Further the signal obtained by decrypting the signal from the signal transmission device is re-encrypted to a encrypted signal different from the encrypted signal supplied form the signal transmission device and either the encrypted signal supplied from the signal transmission device or the re-encrypted signal is selected and supplied to the signal reception device. Further when it is judged that the signal reception device is the proper device, then the key information for decrypting the supplied signal is supplied to the signal reception device.

Further the selection of the encrypted signal supplied from the signal transmission device or the re-encrypted signal is controlled by either a signal from the signal transmission device or the signal from the operation input means, and thus selected signal is supplied to the signal reception device.

BRIEF DESCRIPTION OF THE DRAWINGS

In the accompanying drawings:

FIG. 10 is a chart showing a conventional signal reception device having a relay function.

DETAILED DESCRIPTION OF THE PREFERRED EMBODIMENTS

Figure 1:
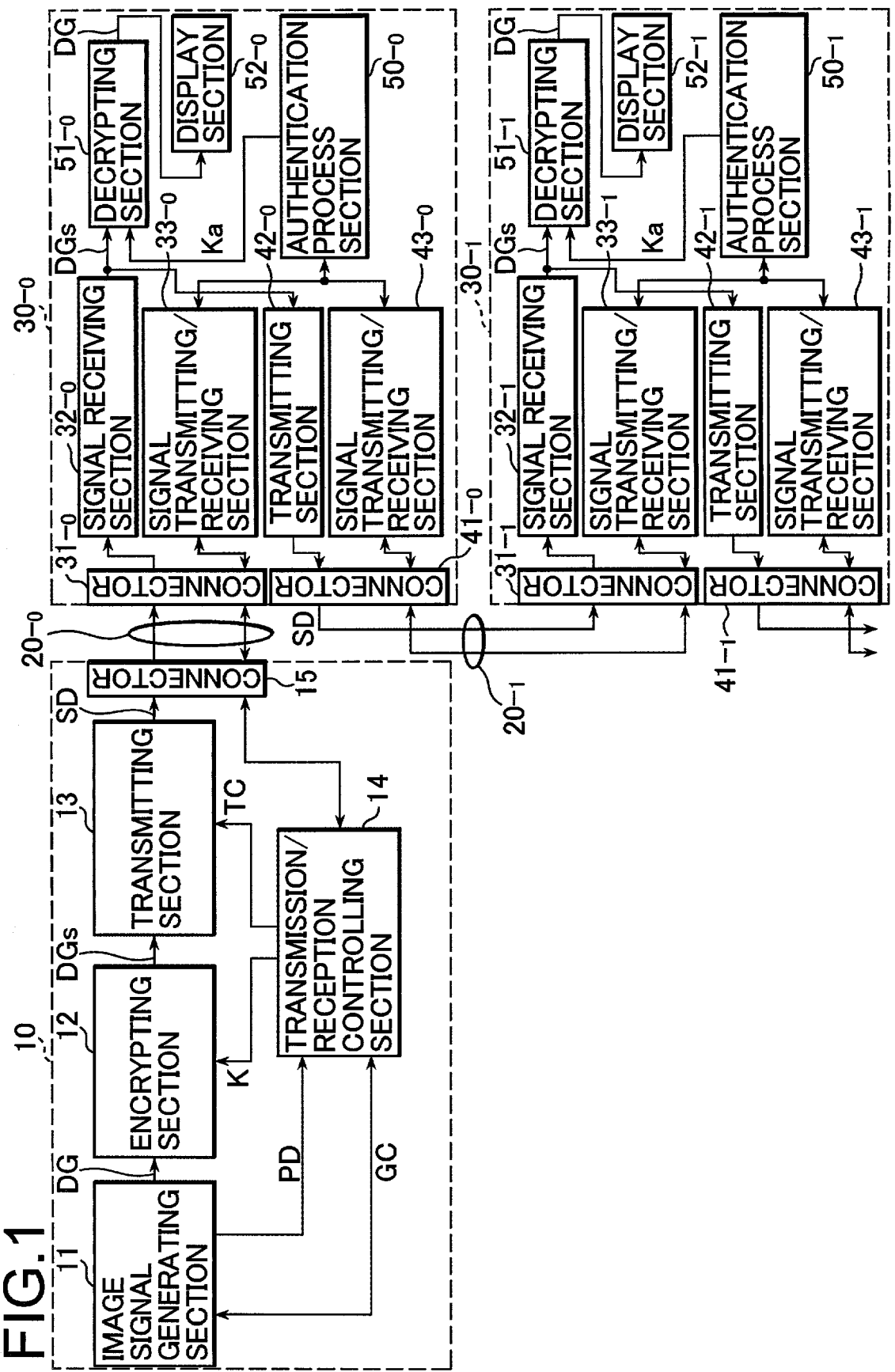
FIG. 1 is a conceptual chart for a signal transmission system of the present invention.

Now, embodiments of the present invention are described in detail with reference to the accompanying drawings as follows. FIG. 1 is a conceptual chart of a signal transmission system for transmitting a digital image signal of contents data, for example. A signal transmission device 10 (such as a computer apparatus, a set-top box, an optical disk player or the like) for transmitting the digital image signal and a signal reception device 30 (such as a display device, a television set or the like) for receiving the digital image signal are mutually connected through a signal transmission line 20 that includes the TMDS high-speed serial bus that is a transmission line of the DVI format, a two-way serial bus for information transmission in the DDC format relating to the Plug & Play proposed by the VESA and/or a signal line for detecting a hot-plug.

In an image signal generating section 11 of the signal transmission device 10 in FIG. 1, three primary color digital image signals DG of the contents data are generated and supplied to an encryption section 12 by reproducing optical and/or magnetic type recording medium or semiconductor type recording medium. Or the three primary color digital image signals DG are generated based on a data signal for the contents data obtained through a communication line and supplied to the encryption section 12. Further in the image signal generating section 11, an existence of legal protection for the contents data is judged. For example, necessity of copy protection is judged based on a copyright protect information, and then an identification signal PD is supplied to a transmission/reception controlling section 14. As the copyright protect information, the CGMS (Copy Generation Management System) information, the CCI (Copy Control Information), information or the like that designate the contents data to be copy-free, to be copy-inhibited or to be copy-allowed only once are employed. Further in case of transmitting a digitized analog image signal by supplying an analog image signal to the image signal generating section 11, necessity of copyright protection may be judged based on the APS (Analog Protection system) signal used in an analog image signal field. In this case, a signal generation control signal GC is supplied to the image signal generating section 11 from the transmission/reception controlling section 14, and the generation of the three primary color digital image signals DG for the contents data is execution with an appropriate resolution and colors suitable for the signal reception device 30.

When the transmission/reception controlling section 14 judges that the three primary color digital image signal DG to be supplied to the encryption section 12 are legally protection signal based on the identification signal PD supplied from the image signal generating section 11, key information K is supplied to the encryption section 12.

The encryption section 12 executes an encryption an encryption of the three primary color digital image signals DG by applying the key information K supplied from the transmission/reception controlling section 14, generates digital signals DGs of respective color and supplies them to the transmitting section 13.

The transmitting section 13 executes conversion of the supplied digital signal DGs into a base band serial transmission signal SD that is suitable for transmission by encoding process while seeking equalizing of a LDC level and minimizing the alternation number of logic levels. The serial transmission signal SD of respective digital color signals DGs is supplied to the high-speed serial bus through the connector 15. Incidentally, horizontal synchronizing signals and vertical synchronization signals of the three primary color digital image signals DG are transmitted by inserting in blanking intervals of the blue digital image signal, for example.

Further device information such as a model name of a signal reception device is registered at the transmission/reception controlling section 14, wherein the signal reception device is to be connected to the signal transmission device 10. The registered device information designates a signal reception device that does not have a function to copy the contents data without deteriorating image quality, namely a signal reception device that does not have function to output the supplied digital image signal and also does not have function to output the digital image signal by converting into a video signal of the NTSC (National Television Systems Committee) format.

The transmission/reception controlling section 14 executes a communication with the signal reception device 30-0 through the connector 15 and the signal transmission line 20-0 in accordance with the DDC protocol and judges by an authentication process based on the device information supplied from the signal reception device 30-0 if the connected signal reception device 30-0 is registered at the transmission/reception controlling section 14 as an authorized device, namely, a device having no function to copy the contents data without deterioration of the image quality. When the signal reception device 30-0 is authenticated as a registered the authorized device, then the key information to be used upon decrypting the encrypted digital signal DGs is supplied to the signal reception device 30-0. Further the transmission/reception controlling section 14 controls the generation and the transmission process of the base band serial TC to the transmitting section 13.

A signal receiving section 32-0 and a signal transmitting/receiving section 33-0 are connected to a connector 31-0 of the signal reception device 30-0 as a first communication means, and the signal receiving section 32-0 executes a decrypting process for the received serial transmission signal SD, generates the three primary color digital signal DGs, and supplies to a decrypting section 51-0 and a transmitting section 42-0 constructing a second communication means. Further a signal transmitting/receiving section 33-0 is connected to a signal transmitting/receiving section 43-0 that constructs a second communication means within the signal reception device and an authentication process section 50-0 is connected to an internal two-way serial bus of the signal reception device 30-0.

The authentication process section 50-0 executes an authentication process to the signal transmission device 10 of an electronic device at the signal transmitting side. Namely, information designating a type of an electronic device of the signal transmission device 10 judges as if the connected electronic device is an authorized device based on the supplied information. When it is judged that the authorized device is connected and the key information Ka for decrypting the digital signal DGs is then supplied from the signal transmission device 10 to the signal reception device 30-0 through the two-way serial bus, after that the authentication process section 50-0 supplies the key information Ka to the decrypting section 51-0.

The decrypting section 51-0 executes decrypting process of the encrypted digital signal DGs supplied from the signal receiving section 32-0 based on the key information Ka supplied from the authentication process section 50-0. The three primary color digital image signals DG obtained at the decrypting section 51-0 by decryption is supplied to a display section 52-0 as a processing means for an image display operation, and the display section 52-0 executes the image display based on the supplied three primary color digital image signals DG.

A transmitting section 42-0 executes an encoding process for transmitting the supplied digital signal DGs similar to the transmitting section 13, generates a serial transmission signal SD and supplies it to a connector 41-0.

A connector 31-1 of another signal reception device 30-1 is connected to the connector 41-0 of the signal reception device 30-0 through the signal transmission line 20-1 constructed by the high-speed serial bus or the two-way serial bus. The ;signal reception device 30-1 has a construction similar to the signal reception device 30-0 and the authentication process section 50-1 of the signal reception device 30-1 executes the authentication with the signal transmission device 10 by way of the two-way serial bus like the signal reception device 30-0. In this case, when it is judged that the authorized device is connected and the key information from the signal transmission device 10 is connected and the key information from the signal transmission device 10 is supplied to the authentication process section 50-1 of the signal reception device 30-1, then the key information Ka is supplied to the decrypting section 51-1.

The serial transmission signal SD from the transmitting section 42-0 of signal reception device 30-0 is supplied to the signal receiving section 32-1 of the signal reception device 30-1, and the signal receiving section 32-1 executes a decrypting process for the serial transmission signal SD, generates the digital signal DGs and supplies it to the decrypting section 51-1 and the transmitting section 41-1, respectively.

The decrypting section 51-1 executes a decryption for the encrypted digital signal DGs supplied from the signal receiving section 32-1 using the key information Ka supplied from the authentication process section 50-1, and thus obtained three primary color digital image signals DG are supplied to the display section 52-1 for image display.

In this case, the serial transmission signal SD supplied to the signal reception device 30-1 is the one that is supplied through the signal receiving section 32-0 and the transmitting section 42-0 of the signal reception device 30-0 and is not a signal generated after encryption and decryption. Accordingly, a delay time of the serial transmission signal SD at the signal reception device 30-0 becomes less than the case where the serial transmission signal SD is generated after encryption and decryption, and therefore, timings from displaying the image on the display section 52-0 of the signal reception device 30-0 and for displaying the image on the display section 52-1 of the signal reception device 30-1 can be approximately the same time.

Further the signal reception device 30-0 is connected to the signal reception device 30-1, the signal reception device 30-0 becomes an electronic device of the signal transmitting side, the signal reception device 30-0 connected to the connector 41-1 of the signal reception device 30-1 becomes an electronic device of the signal receiving side and the signal reception device 30-1 executes a processing similar to the processing done by the above-mentioned signal reception device 30-0. Similarly, as the supplied signal is transmitted to an electronic device of a next stage without decryption or encryption at respective signal reception device, provided that a plurality of signal reception devices are connected to the signal transmission device 10 in a daisy-chain connection, a delay time of the serial transmission signal SD becomes smaller than the case where the serial transmission signal is generated by decryption and encryption and is output, so that a timing of the image signal of the signal reception device connected to the signal transmission device can be accorded with a timing of the image of the signal reception device positioned at end of the signal reception device connected in a daisy-chain connection.

Incidentally, according to the above-mentioned embodiment, an authentication process id executed among the daisy-chain connected signal transmission device and the respective signal reception device through the two-way serial bus, and if it is judged that the authorized device is connected, the key information id transmitted from the signal transmission device to the signal reception device through the two-way serial bus, but a load of the authentication process by the signal transmission device can be reduced by conducting the authentication process among daisy-chain connection signal reception devices.

Figure 2:
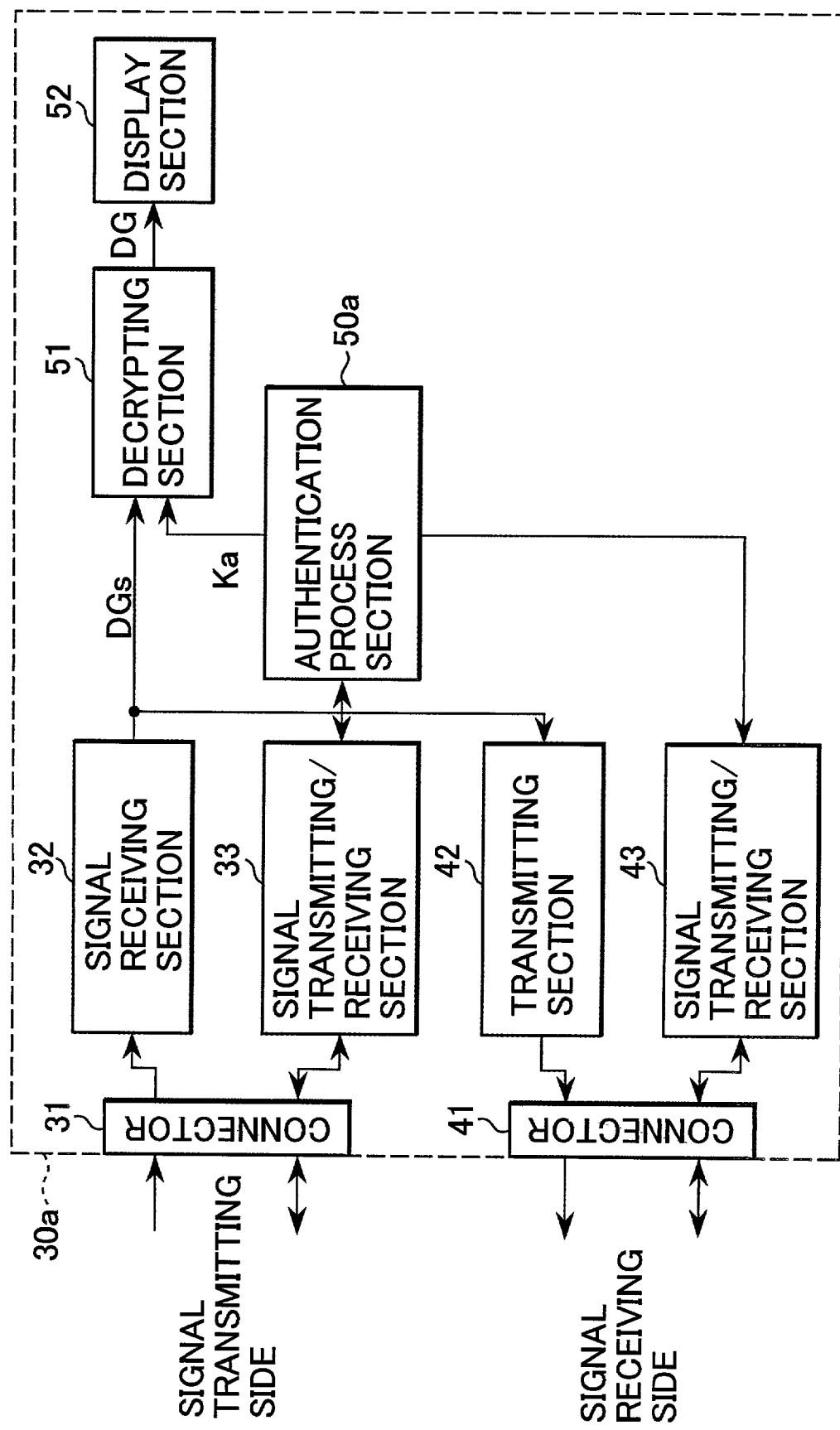
FIG. 2 is a chart showing another construction of a signal reception device to be used in the signal transmission system of the present invention.
Figure 3:
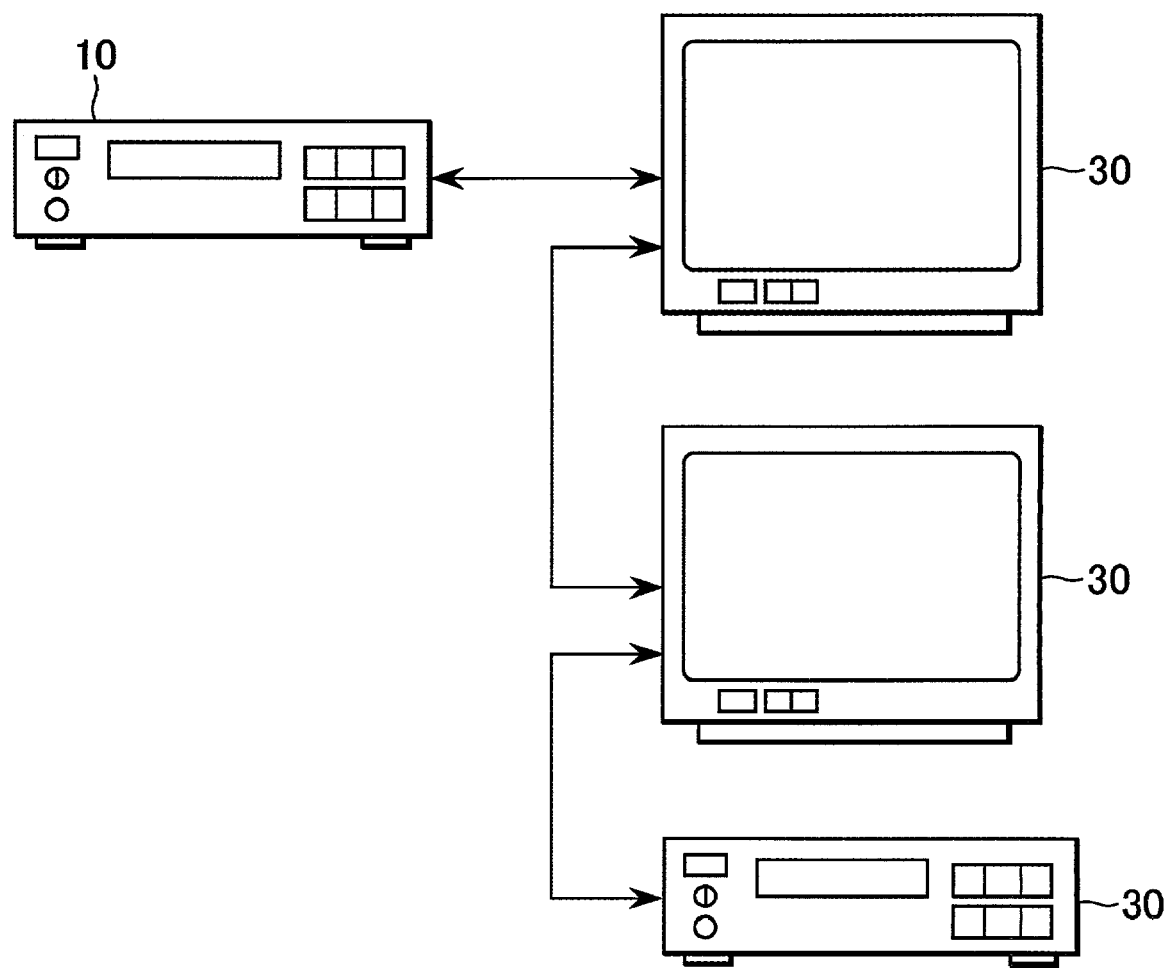
FIG. 3 is a chart showing signal reception devices connected in a daisy-chain connection.

FIG. 2 shows a construction of the signal reception device 30*a* in the case of conducting the authentication process among the connected signal reception devices. In this case, the signal transmitting/receiving section 33 and the authentication process section 50*a* are connected to each other and the signal transmitting/receiving section 43 is connected to the authentication process section 50*a*, but the signal transmitting/receiving section 33 and the signal transmitting/receiving section 43 are not connected through the internal bus. In this case, any portions in FIG. 2 corresponding to the portions in FIG. 1 are numbered with the same reference numerals, and detailed description is omitted here.

In the authentication process section 50*a*, the device information designating a type of the signal reception device is supplied to the signal transmission device 10 of the signal transmitting side connected to the connector 31 and executes an authentication with the signal transmission device 10. Further, like the transmission/reception controlling section 14 of the signal transmission device 10, the authentication process section 50*a* registers the device information designating the signal reception device that does not have a function to copy the contents data without reception device that does not have a function to copy the process is executed if the authorized device is connected by comparing the device information supplied from the signal reception device connected to the connector 41 as the signal receiving side with the registered device information.

When it is judged by the authentication with the signal transmission device 10 that the authorized device is connected, and the key information Ka is supplied from the signal transmission device 10, this key information Ka is supplied to the decrypting section 51 from the authentication process section 50a. Further when it is judged by the authentication between the authentication process section 50a and the device connected to the connector 41 that the authorized device is connected, the key information Ka supplied from the signal transmission device 10 is transmitted to the electronic device connected to the connector 41.

As above-described, when the authentication process is done among electronic devices connected in a daisy-chain connection, it is possible to display images at each signal reception device with approximately equal timing to each other and further a load for the authentication process in the signal transmission device can be reduced.

Figure 4:
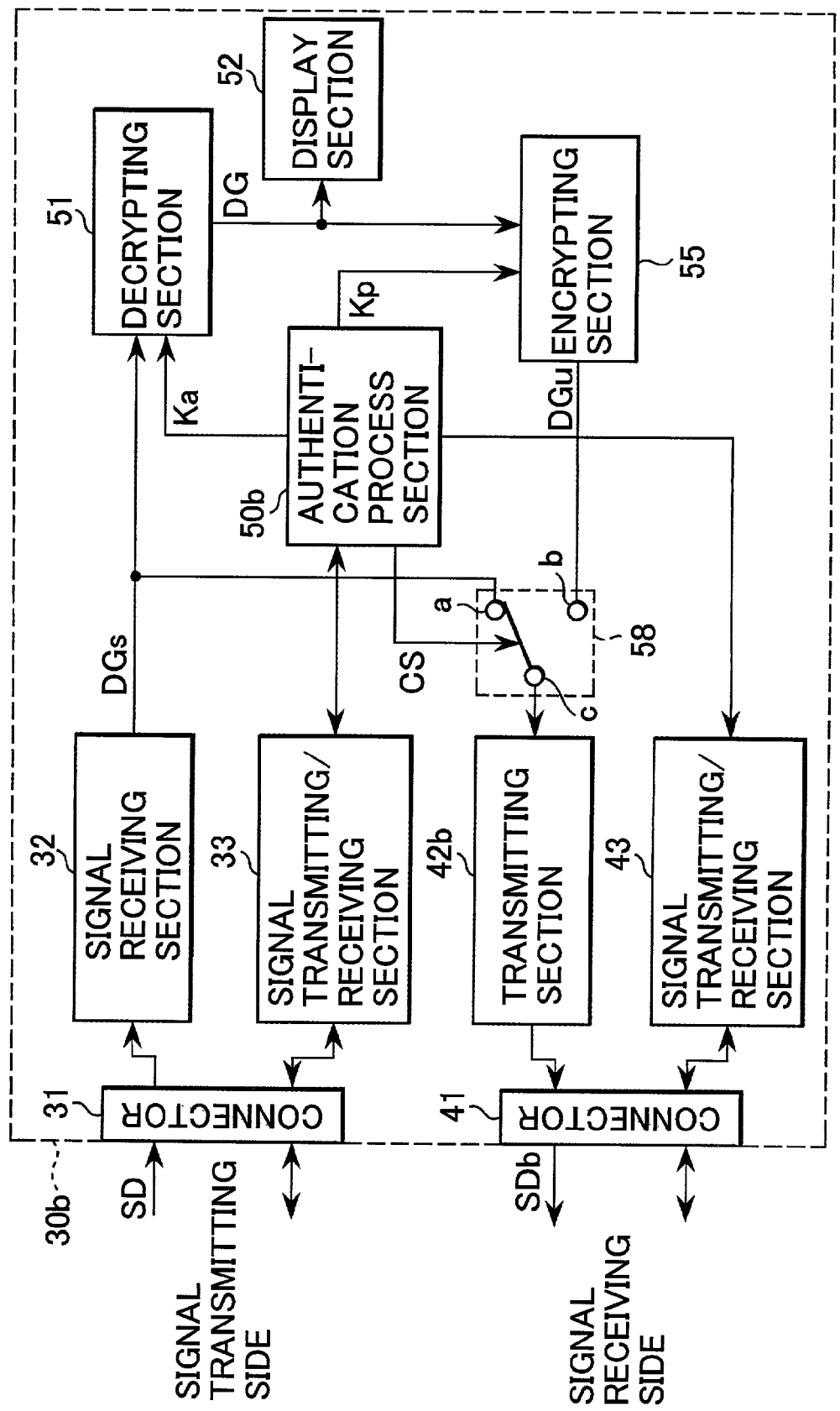
FIG. 4 is a chart for showing another construction of a signal reception device for improving effective legal protection.

Further in the above-described embodiment, the daisy-chain connected signal reception device is the device for the image display and simultaneous display of the image is done by the plural signal reception devices, bu these are not limited to the daisy-chain connected devices having image display function. For example, there is a case where a first copy is legally allowed by the CGMS information, and when the contents data is coped once, a device having signal recording function to record the digital signal of the contents data is connected. In this case, even the serial transmission signal SD is delayed, the contents data can be recorded correctly, so that secure legal protection becomes more important than the simultaneity of the serial transmission signal SD. Thereby, a signal reception device that can improve the effect of the legal protection is shown in FIG. 4 as a third embodiment of the present invention. In this case, portions corresponding to portions in FIG. 2 are numbered with the same numerals in FIG. 4 and detailed explanations are omitted.

The signal transmission device 10 has a function of a display priority mode that gives a priority to simultaneous display of the image and a function of a protection priority mode that gives a priority to the higher legal protection. When it is judged that the authorized devices is connected in the function of the display priority mode, key information for decrypting the signal from the transmitting section 13 is supplied to the signal reception device 30b as described above. When the function is set to the protection priority mode, not only the above key information Ka but also a new key information Kp are together supplied to the authentication process section 50b.

The digital signal DGs obtained by conducting the decryption process for the serial transmission signal SD at the signal receiving section 32 of the signal reception device 30b is supplied to a terminal a of a signal switching section 58 which constitutes a second communication means together with a decrypting section 51. A terminal b of this signal switching section 58 is connected to a later described encryption section 55 and is supplied with an encrypted digital signal DGu and a moving terminal c is connected to the transmitting section 42. Further a moving terminal c of the signal switching section 58 is switched to either the terminal a or the terminal b based on the selection signal CS from the authentication process section 50b.

The decrypting section 51 executes the decryption of the supplied digital signal DGs and thus obtained digital image signal DG is supplied to the display section 52 and the encryption section 55. In this case when ;the signal reception device 30b has a signal recording function, a signal recording section is employed instead of the display section 52 as a processing means for signal recording operations, and the recording process from the digital image signal DG is executed by this signal recording section.

The transmitting section 42b executes the encryption process of the digital signal DGs or the digital signal DGu selected by the signal switching section 58 and transmitted through the connector 41 after converting into a base-band serial transmission signal SDb that is suitable for transmission.

The authentication process section 50b supplies the supplied key information Ka to the decrypting section 51, and further when new key information Kp is supplied, the authentication process section 50b supplies this key information Kp to the encrypting section 55. The encrypting section 55 executes the re-encryption of the digital image signal DG by applying the key information Kp and generates the digital encrypted signal DGu and then supplies this to the terminal b of the signal switching section 58.

Further the authentication process section 50b generates the selection signal CS and supplies to the signal switching section 58 to set the moving terminal c to the terminal a or to set the moving terminal c to the terminal b when new key information Kp is supplied. Further the authentication process section 50b executes the authentication process to the device connected to the connector 41, and if it is judged that the authorized device is connected, then, key information for decrypting the digital signal DGu encrypted by the new key information Kp is transmitted to the device connected to the connector 41. In this case, new key information to be applied at each signal reception device for encrypting process and key information for decrypting the encrypted digital signal are may be transmitted to each signal reception device from the signal transmission device 10 or may be generated at each signal reception device and transmitted to electronic devices connected thereto. Further a signal switching operation of the signal switching section 58 may be directly controlled by the signal transmission device 10 through the two-way serial bus depending on the operating mode.

Further when the information designating the electronic device connected thereto by relaying each signal reception device is reported to the signal transmission device 10 upon executing the authentication among electronic devices, the function at the signal transmission device 10 can be automatically switched to either the display priority mode or the legal protect priority mode depending on the electronic device connected thereto. For example, any of the signal reception device connected to the signal transmission device 10 in the daisy-chain connection is the electronic device that executes only the display operation, then the display priority mode is set, and the electronic device capable of recording signal is connected, then automatically switched to the legal protect priority mode. As described above, when the mode is automatically switched either the display priority mode or the legal protect mode depending on the connected device, the mode is set to the display priority mode provided that the all of the signal reception devices execute only the display operations, then the encrypted signal encrypted in the signal transmission device 10 is directly and serially transmitted between the devices, and accordingly, as described above, the time delay is reduced and the timings of the image display at each of the signal reception devices can be made the same. Further when the device capable of recording signal is connected, the legal protection priority mode is selected and the serial transmission signal transmitted among the electronic devices become one that is based on the digital signal encrypted with different key information, and therefore it becomes difficult to easily obtain the digital image signal and the effect of the legal protection can be improved accordingly.

Figure 5:
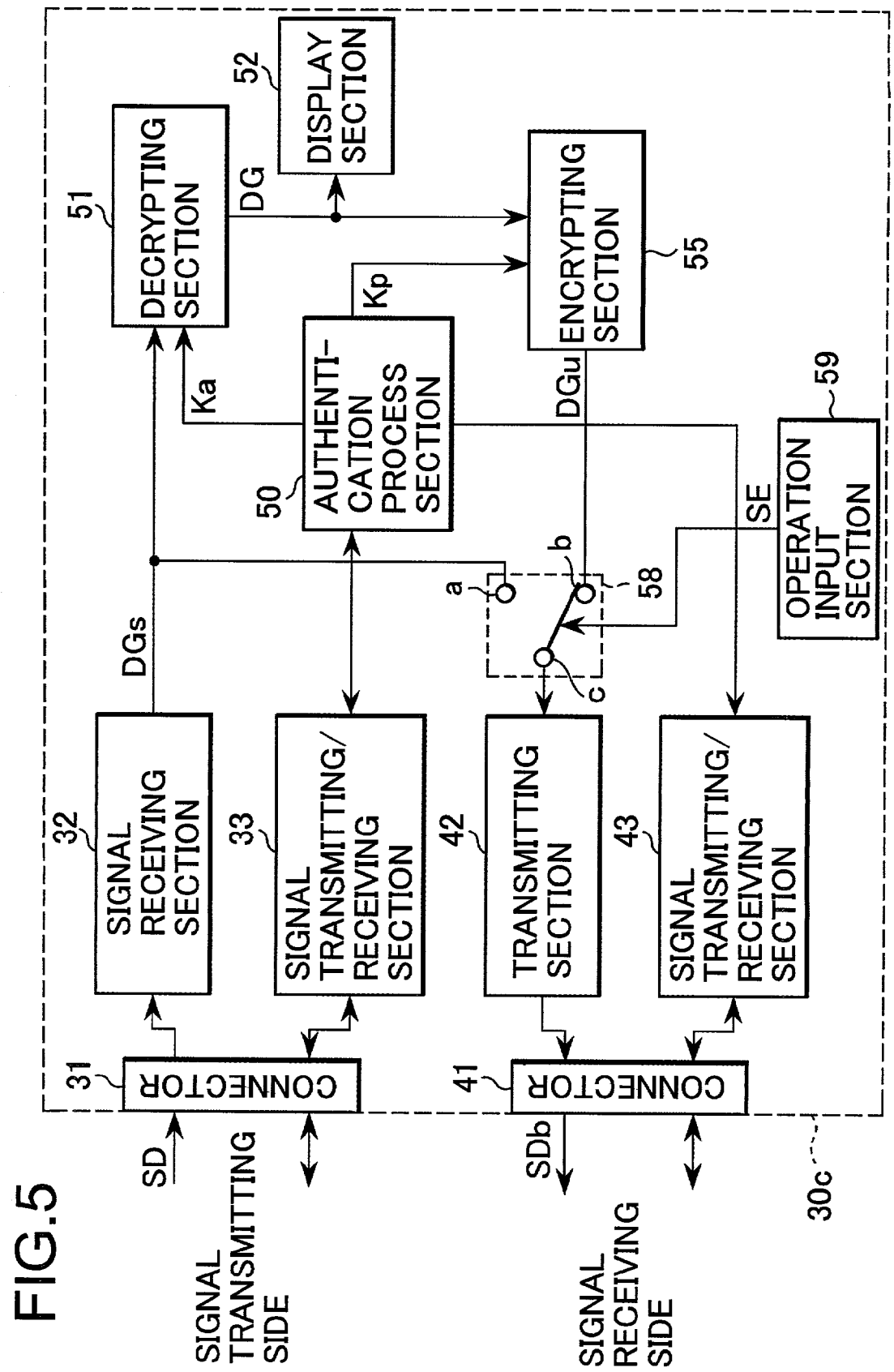
FIG. 5 is a chart for showing another construction of a signal reception device for improving effective legal protection.
Figure 6:
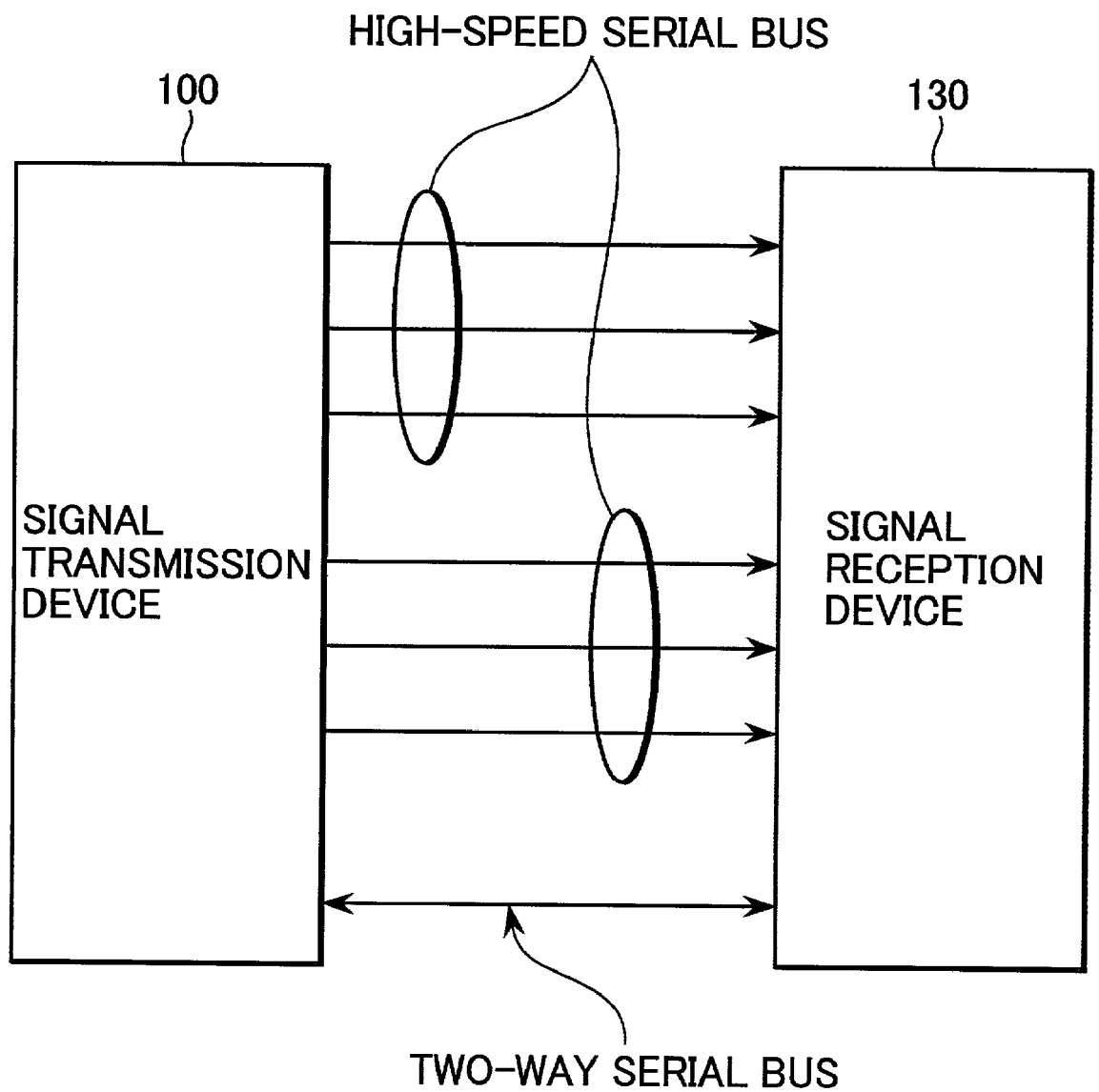
FIG. 6 is a conceptual chart for a construction of a digital connection.
Figure 7:
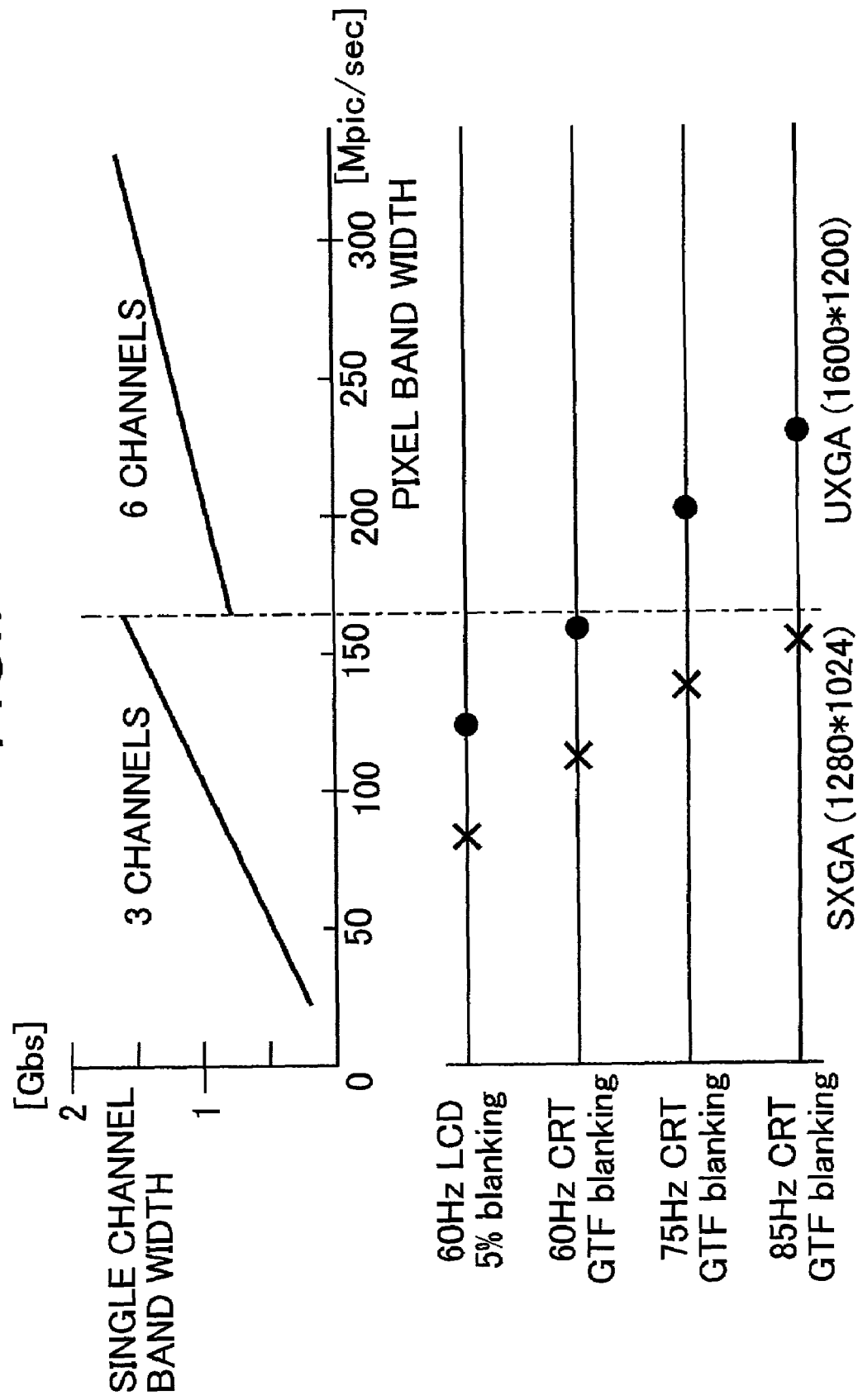
FIG. 7 is a chart for showing a transmission band of a high-speed serial bus.
Figure 8:
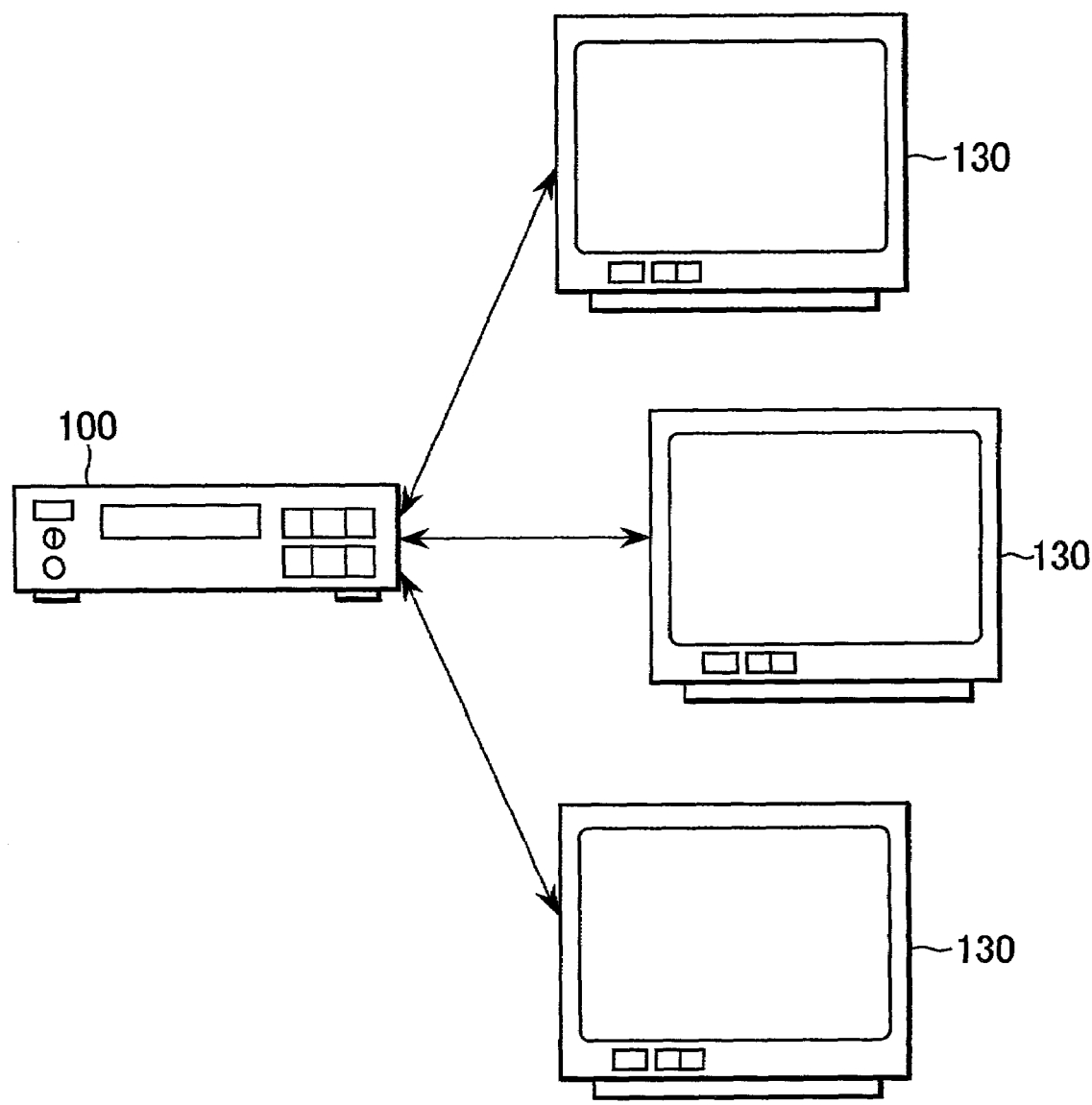
FIG. 8 is a chart showing a case where a signal transmission device and a plurality of signal reception devices are connected in a star connection.
Figure 9:
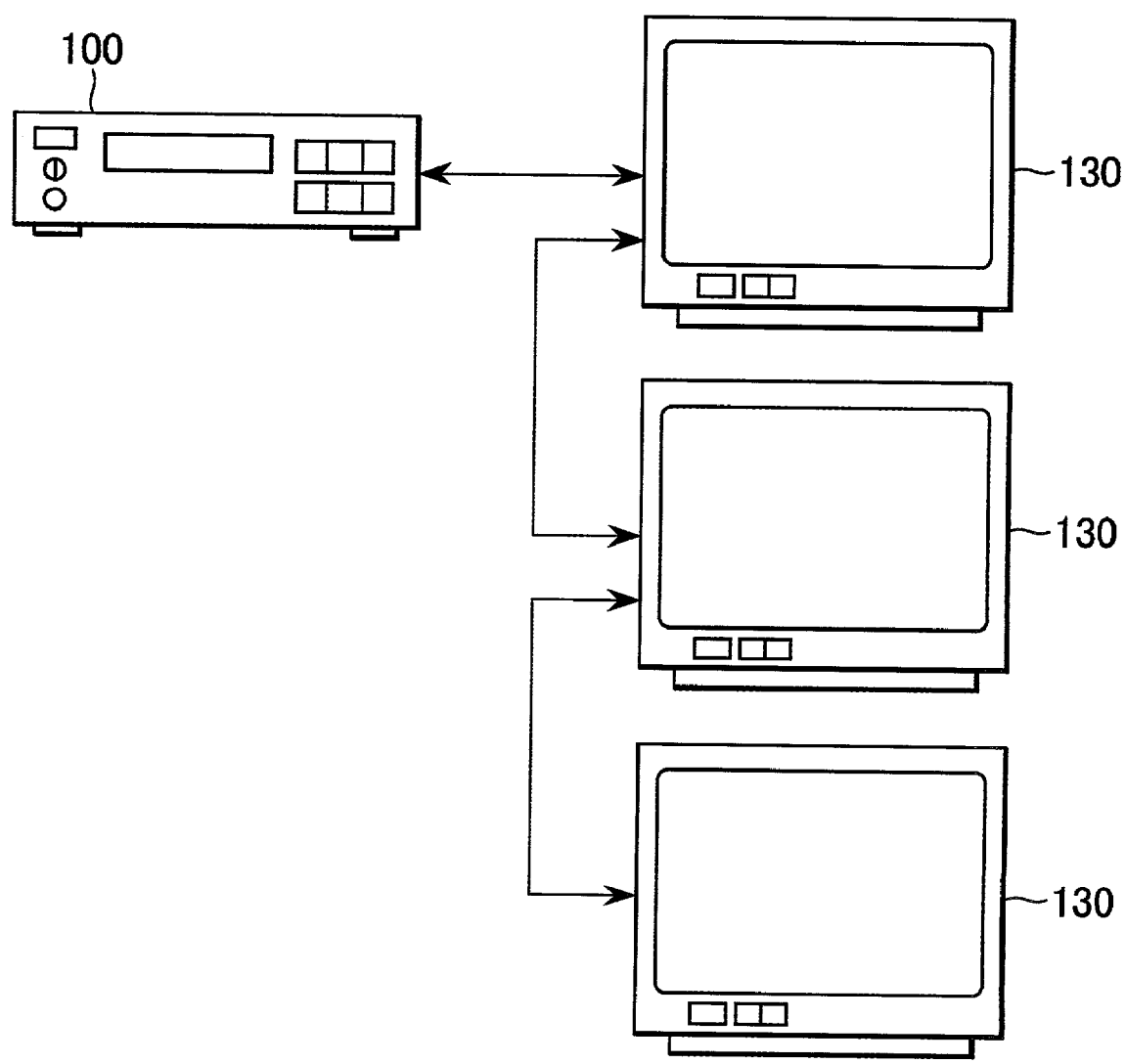
FIG. 9 is a chart showing a case where a signal transmission device and a plurality of signal reception devices are connected in a daisy-chain connection.

Incidentally in the embodiment in FIG. 4, when the new key information Kp is supplied, the signal switching section 58 is arranged to be automatically controlled by the selection signal CS to output the encrypted signal encrypted based on the new key information Kp. But like the signal reception device 30c as shown in FIG. 5, the switching operation of the switching section 58 may be controlled based on the operation signal SE from the operation in put section 59. In this case, it becomes possible for a user to arbitrary select an output digital signal.

Further although not illustrated, when it is informed that which of the digital signal is selected to the signal transmission device 10 by supplying the operation signal SE to the authentication process section 50, then the signal transmission device 10 can automatically switch the operation mode to either the display priority mode or the protection priority mode based on the operation of the operation input section 59 at the signal reception device.

As described above, even when plural electronic devices are connected through a signal transmission line in a daisy-chain connection, a delay at each device is minimized according to the embodiment of the present invention, so that simultaneity of the display image at each electronic device can be guaranteed upon connecting the plural electronic devices. Further it is possible to encrypt the transmission signal and to transmit between respective electronic devices with different key information, so that the effect of the legal protection is improved when transmitting digital signal with a legal protection such as copyright protection. Further by connecting a plurality of the electronic devices in the daisy-chain connection, the number of connectors at each device is reduced.

According to the present invention, an authentication process is executed with an electronic device of a signal transmission side connected through a signal transmission line for connecting between electronic devices, and a decryption is executed for the encrypted signal supplied from the electronic device of the signal transmitting side. A;n further the encrypted signal supplied from the electronic device of the signal transmitting side is supplied to the electronic device of the signal receiving side connected through the signal transmission line. Further an authentication process or a relay for the authentication process is executed to the electronic device of the signal receiving side, and if it is judged that the authorized device is connected, then key information for decrypting the encrypted signal is supplied to the electronic device of the signal receiving side.

Because of this, even when plural electronic devices are connected in multi-stage through the signal transmission line for connecting among devices, sequentially transmitting signals are not re-encrypted after decryption, it is possible to reduce a delay time and if the image display is executed at each electronic device based on the supplied signal, then, the simultaneity of the display image can be maintained.

Further the signal obtained by decrypting the supplied signal from the electronic device of the signal transmitting side is re-encrypted to the signal different from the signal supplied from the signal transmission device, and either one of the re-encrypted signal or the encrypted signal supplied from the electronic device of the signal transmitting side is supplied to the electronic device of the signal receiving side. Further when it is judged that the connected electronic device of the signal receiving side is the authorized device, then key information for decrypting the supplied signal is then supplied to the electronic device of the signal receiving side.

Accordingly, if the transmission signal is a signal of the contents data to be legally protected, it is possible for the transmission signal to be an encrypted signal encrypted by different key information between electronic devices, so that an effect of the legal protection can be greatly improved.

What is claimed is:

1. An electronic transmission system, comprising:
a first electronic transmission apparatus; and
a second electronic transmission apparatus;
said first electronic transmission apparatus including:
first communication means, connected to a signal transmission line, for receiving a first encrypted signal from a transmitting electronic device over the signal transmission line,
first authentication process means for executing a first authentication process by which the transmitting electronic device authenticates said electronic transmission system via said first communication means and the signal transmission line, and for receiving first key information and second key information from the transmitting electronic device via said first communication means and the signal transmission line if the transmitting electronic device determines that said first electronic transmission apparatus is an authorized device,
first decryption means for decrypting the first encrypted signal using the first key information, the first key information being supplied by said first authentication process means,
first processing means for processing the first decrypted signal, said first processing means including a first section operable to at least one of display or record the first decrypted signal,
first encryption means for re-encrypting the first decrypted signal using the second key information, the second key information being supplied by said first authentication process means,
first signal switching means for receiving first selection signal provided by said first authentication process means and which indicates whether a display priority mode or a legal protect priority mode is set, the first selection signal indicating that the display priority mode is set if said second electronic transmission apparatus does not have a recording capability, and the first selection signal indicating that the legal protect priority mode is set if said second electronic transmission apparatus has the recording capability,
said first signal switching means selecting the first encrypted signal for output to said second electronic transmission apparatus if the display priority mode is set and selecting the first re-encrypted signal for output to said second electronic transmission apparatus if the legal protect priority mode is set, the first encrypted signal being supplied to said first signal switching means by said first communication means, the first re-encrypted signal being supplied to said first signal switching means by said first encryption means, and
second communication means, connected to the signal transmission line, for transmitting the selected one of the first encrypted signal and the first re-encrypted signal over the signal transmission line to said second electronic transmission apparatus when a second authentication process determines that said second electronic transmission apparatus is an authorized device;

said second electronic transmission apparatus including:
third communication means, connected to the signal transmission line, for receiving a second encrypted signal from said first electronic transmission apparatus over the signal transmission line, the second encrypted signal being the selected one of the first encrypted signal and the first re-encrypted signal, second authentication process means for executing the second authentication process with either the transmitting electronic device or said first electronic transmission apparatus, and for receiving third key information and further key information from either the transmitting electronic device or said first electronic transmission apparatus, the further key information being the first key information if the second encrypted signal is the first encrypted signal and being the second key information if the second encrypted signal is the first re-encrypted signal, second decryption means for decrypting the second encrypted signal using the received further key information, second processing means for processing the second decrypted signal, said second processing means including a second section operable to at least one of display or record the second decrypted signal, second encryption means for re-encrypting the second decrypted signal using the third key information, the third key information being supplied by said second authentication process means, second signal switching means for receiving a second selection signal provided by said second authentication process means and which indicates whether the display priority mode or the legal protect priority mode is set, the display priority mode being set if the receiving electronic device does not have a recording capability, the display priority mode being set if the receiving electronic device has the recording capability, said second signal switching means selecting the second encrypted signal for output to said receiving electronic device if the display priority mode is set and selecting the second re-encrypted signal for output to said receiving electronic device if the legal protect priority mode is set, the second encrypted signal being supplied to said second signal switching means by said third communication means, the second re-encrypted signal being supplied to said second signal switching means by said second encryption means, and fourth communication means, connected to the signal transmission line, for transmitting the selected one of the second encrypted signal and the second re-encrypted signal over the signal transmission line to the receiving electronic device when a third authentication process determines that the receiving electronic device is an authorized device, the third authentication process being carried out between the receiving electronic device and either the transmitting electronic device or said second authentication process means.

2. The electronic transmission apparatus according to claim 1, wherein the first selection signal is supplied by the transmitting electronic device via said first communication means and the signal transmission line.

3. The electronic transmission apparatus according to claim 1, further comprising:
operation input means for providing a user-inputted signal for controlling the switching operation of one or more of said first signal switching means and said second signal switching means.

4. A signal transmission method, comprising:
executing a first authentication process between a transmitting electronic device and a first electronic transmission apparatus over a signal transmission line;

receiving, at the first electronic transmission apparatus, a first encrypted signal from the transmitting electronic device over the signal transmission line;

receiving, at the first electronic transmission apparatus, first key information and second key information from the transmitting electronic device over the signal transmission line if the transmitting electronic device determines that the first electronic transmission apparatus is an authorized device based on the first authentication process;

decrypting, at the first electronic transmission apparatus, the first encrypted signal using the first key information;

executing, at the first electronic transmission apparatus, at least one of displaying or recording the first decrypted signal;

executing a second authentication process between a second electronic transmission apparatus and either the transmitting electronic device or the first electronic transmission apparatus over the signal transmission line;

re-encrypting, at the first electronic transmission apparatus, the first decrypted signal using the second key information;

setting a display priority mode if a second electronic transmission apparatus does not have a recording capability and setting a legal protect priority mode if the second electronic transmission apparatus has the recording capability;

selecting, at the first electronic transmission apparatus for transmission to the second electronic transmission apparatus, the first encrypted signal if the display priority mode is set or the first re-encrypted signal if the legal protect priority mode is set;

transmitting, from the first electronic transmission apparatus to the second electronic transmission apparatus, the selected one of the first encrypted signal and the first re-encrypted signal if it is determined using the second authentication process that the second electronic transmission apparatus is an authorized device;

receiving, at the second electronic transmission apparatus, a second encrypted signal from the first electronic transmission apparatus over the signal transmission line, the second encrypted signal being the selected one of the first encrypted signal and the first re-encrypted signal;

receiving, at the second electronic transmission apparatus if it is determined using the second authentication process that the second electronic transmission apparatus is an authorized device, third key information and further key information from either the transmitting electronic device or the first electronic transmission apparatus, the further key information being the first key information if the second encrypted signal is the first encrypted signal and being the second key information if the second encrypted signal is the first re-encrypted signal;

decrypting, at the second electronic transmission apparatus, the second encrypted signal using the received further key information if the second authentication process determines that the second electronic transmission apparatus is an authorized device;

executing, at the second electronic transmission apparatus, at least one of displaying or recording the second decrypted signal;

executing a third authentication process between a receiving electronic device and either the transmitting electronic device or the second electronic transmission apparatus over the signal transmission line;

re-encrypting, at the second electronic transmission apparatus, the second decrypted signal using the third key information;

setting the display priority mode if the receiving electronic device does not have a recording capability and setting the legal protect priority mode if the receiving electronic device has the recording capability;

selecting, at the second electronic transmission apparatus for transmission to the receiving electronic device, the second encrypted signal if the display priority mode is set or the second re-encrypted signal if the legal protect priority mode is set; and transmitting the selected one of the second encrypted signal and the second re-encrypted signal to the receiving electronic device via the signal transmission line when the third authentication process determines that the receiving electronic device is an authorized device.

5. The signal transmission method according to claim 4, wherein said step of selecting one of the first encrypted signal and the first re-encrypted signal is executed based on a signal received from the transmitting electronic device via the signal transmission line.

6. The signal transmission method according to claim 4, wherein said step of selecting one of the first encrypted signal and the first re-encrypted signal is executed based on a user-inputted signal.

7. The signal transmission method according to claim 4, wherein said step of selecting one of the second encrypted signal and the second re-encrypted signal is executed based on a user-inputted signal.

* * * * *